United States Patent [19]
King

[11] Patent Number: 5,735,189
[45] Date of Patent: Apr. 7, 1998

[54] WATER DIPPER FOR A BREWING MACHINE

[76] Inventor: Alan M. King, 4369 Montrose Ave., Westmount, Canada, H3Y 2B2

[21] Appl. No.: 718,230

[22] Filed: Sep. 20, 1996

[51] Int. Cl.[6] .............................. A47J 31/00; B67D 5/62
[52] U.S. Cl. ..................... 99/300; 99/305; 222/164; 222/166; 222/305
[58] Field of Search .................. 99/300, 301, 305; 222/146.5, 146.1, 146.2, 636, 305, 160, 164, 166

[56] References Cited

U.S. PATENT DOCUMENTS

| | | |
|---|---|---|
| 699,699 | 5/1902 | Newberry ..................... 222/305 |
| 2,327,124 | 8/1943 | Morse ......................... 222/305 |
| 2,786,408 | 3/1957 | Herrera . | 
| 3,261,060 | 7/1966 | McAlpine et al. ............. 222/305 |
| 4,133,354 | 1/1979 | Lerner et al. . |
| 4,473,003 | 9/1984 | Stone, Jr. ..................... 99/305 |
| 4,632,023 | 12/1986 | King . |
| 4,713,253 | 12/1987 | Stone, Jr. . |
| 4,713,526 | 12/1987 | Smit . |
| 4,791,859 | 12/1988 | King . |
| 4,922,809 | 5/1990 | Führer . |
| 4,967,647 | 11/1990 | King . |
| 5,346,098 | 9/1994 | King . |

*Primary Examiner*—Reginald L. Alexander
*Attorney, Agent, or Firm*—Hill & Simpson

[57] ABSTRACT

A water supply dipper for a beverage brewer with the dipper mounted for pivotal movement in the hot water tank and is moved by the brewer motor upwardly and forwardly in the tank to discharge hot water into the brewer. One-way valves in the bottom of the dipper allow water to pass into the dipper.

9 Claims, 4 Drawing Sheets

5,735,189

1
WATER DIPPER FOR A BREWING MACHINE

BACKGROUND OF THE INVENTION

1. Field of the Invention

This invention relates in general to a water supply apparatus for a brewing machine.

2. Description of Related Art

Brewing machines such as coffee machines require a supply of hot water so as to brew the beverage. A number of water supplying apparatuses are known in the prior art. For example, see U.S. Pat. Nos. 2,786,408, 4,922,809, 4,133,354, 4,713,253 and 4,713,526.

SUMMARY OF THE INVENTION

The present invention relates to a hot water supply apparatus for a beverage machine such as a coffee brewer wherein a hot water tank contains a dipper device which is formed with one-way valves in its bottom surface that are covered with one flapper cover such that when the dipper is in the lower position hot water can enter into the dipper and wherein the dipper can be moved to an upper discharge position wherein the water within the dipper is discharged into the brewing machine during which time the flapper cover closes the valves so that the water is discharged into the brewer. The hot water in the tank is maintained at a constant level so that the quantity of water discharged by the dipper is fixed.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

Figure 1:
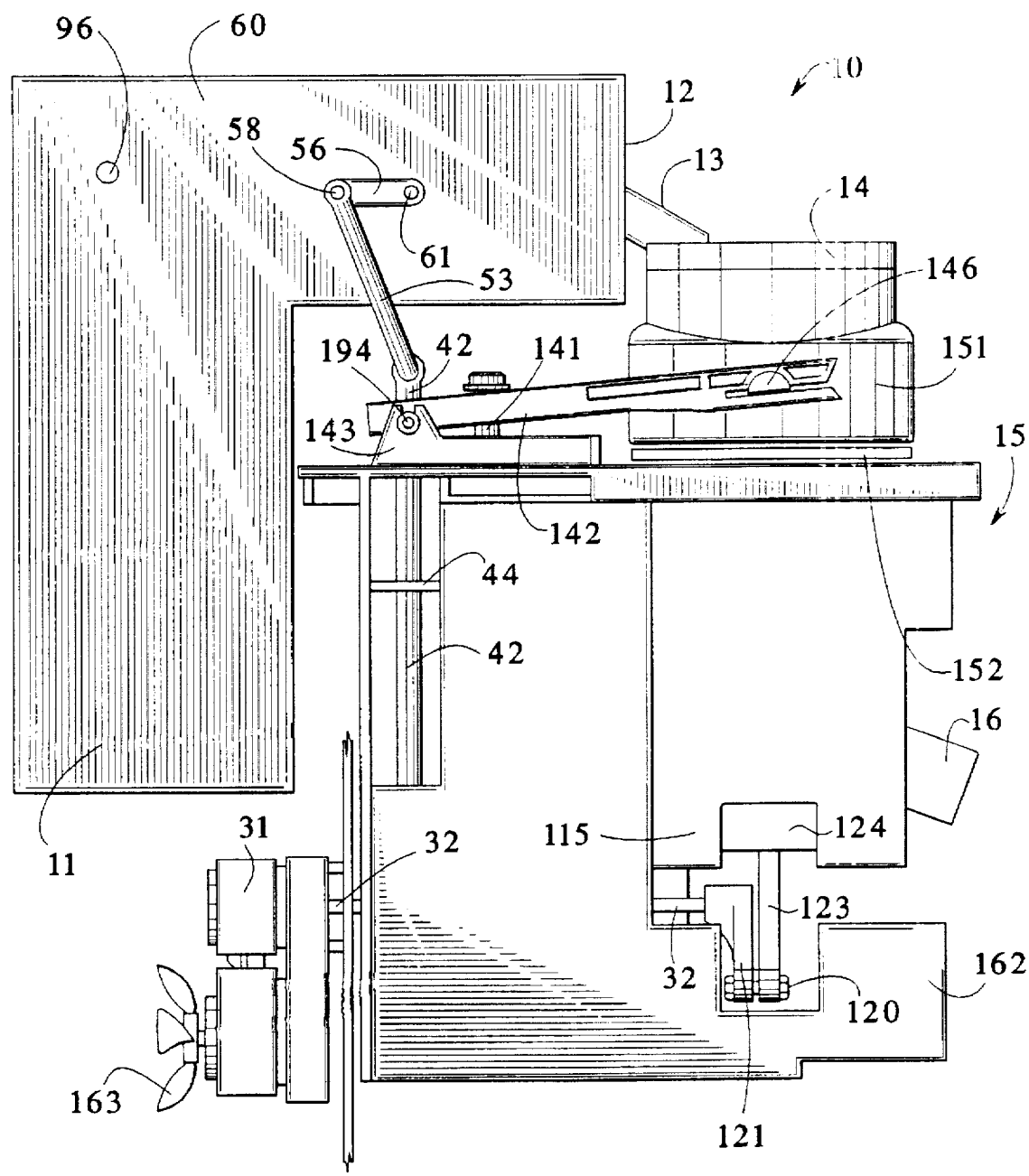
FIG. 1 is a side plan view of the invention.

The Figures illustrate a beverage maker 10 such as a coffee brewer to which is attached a hot water tank 11 for supplying hot water to the brewer through a spout 13 connected to an upper portion that has a front wall 12 and a spout 13 for delivering hot water into a funnel 14 of an upper portion of a coffee brewer 151 which is periodically displaced from a lower coffee brewer 115 which has a brewing screen 152. A piston 124 is mounted in the lower brewing chamber 151 and is driven by a connecting rod 123 which is coupled by a pin 120 to a crank arm 121 which is driven by a shaft 32. Shaft 32 is driven by a motor 31 which also drives a cooling fan 163. A shaft 141 is also driven by a cam mounted on shaft 32 so as to periodically move the support arm 142 about a pivot point 194 supported by bracket 143. The other end of the arm 142 is pivotally connected to a projection 146 of the upper beverage chamber 151 so as to move it into and out of engagement with lower brewing chamber 115 upon actuation of the arm 142.

The detail structure for moving the arm 142 and separating the upper and lower brewing chamber is discussed in greater detail in U.S. Pat. No. 4,632,023.

Figure 2:
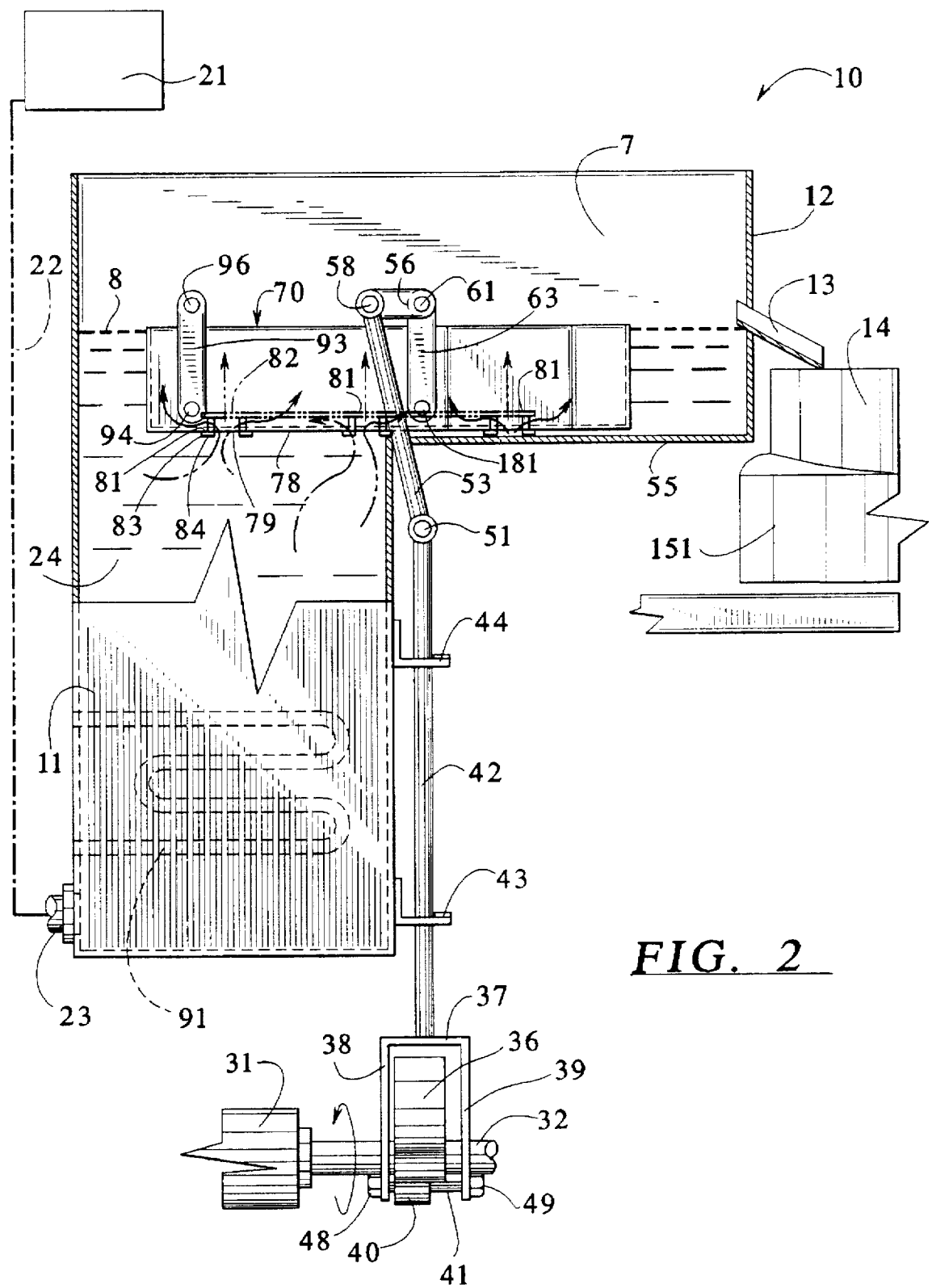
FIG. 2 is a section view illustrating the dipper of the invention.
Figure 3:
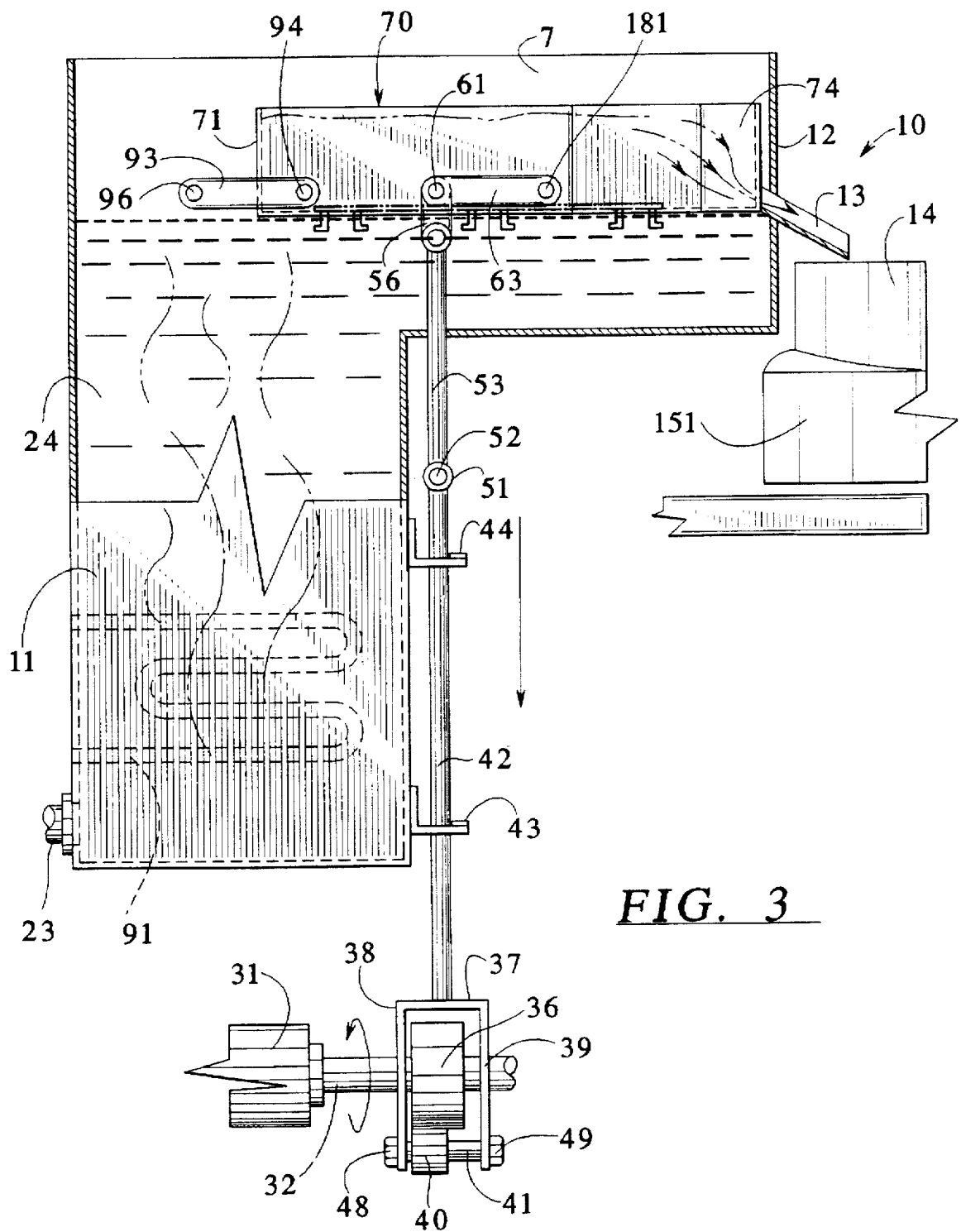
FIG. 3 is a sectional view illustrating the dipper in the discharge position.
Figure 4:
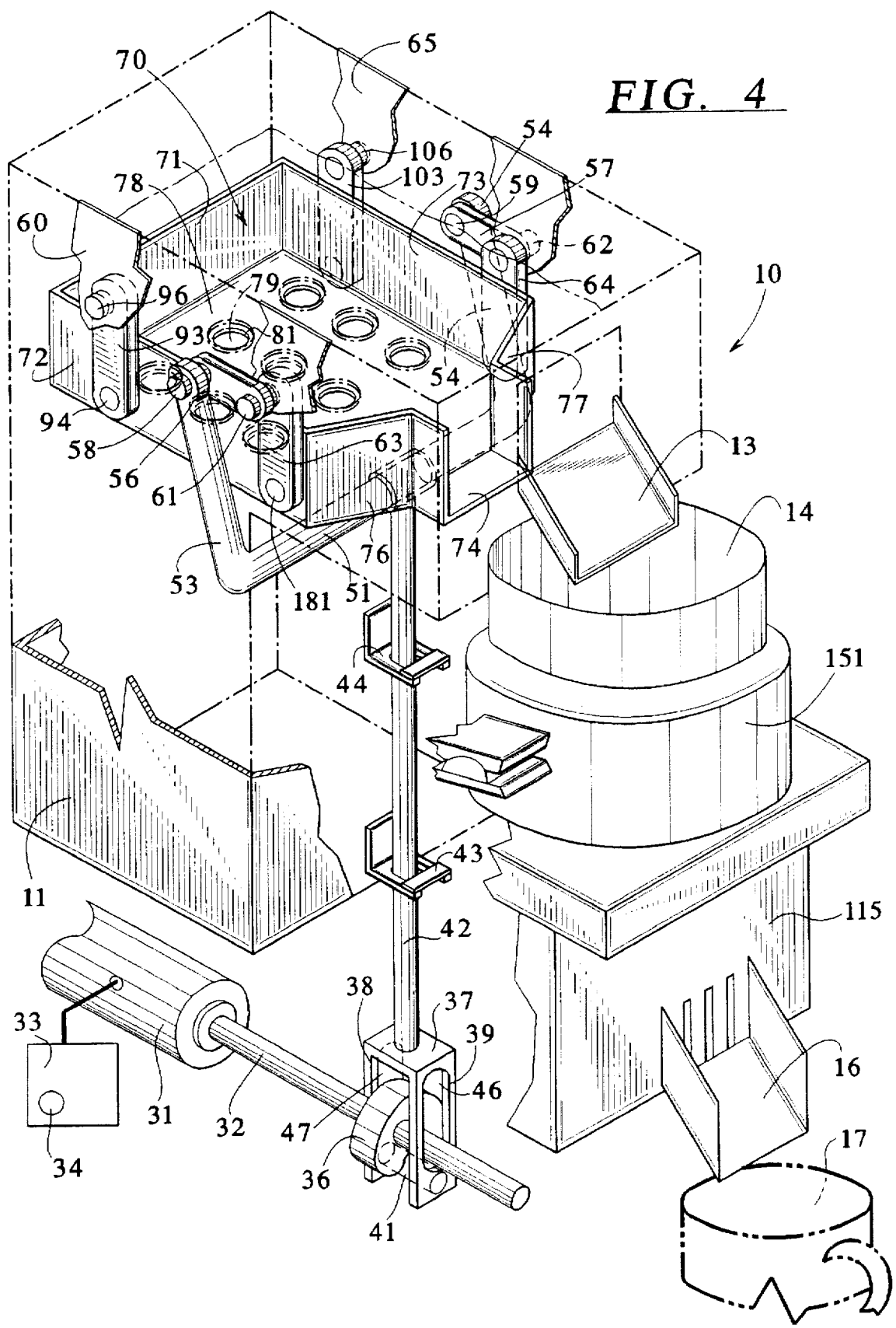
FIG. 4 is a partially cut-away sectional view of the invention.

The present invention particularly relates to the apparatus and method for supplying hot water to the coffee brewer from the tank 11. In FIG. 2, the supply tank 21 is mounted above the tank 11 and has a conduit 22 which is connected to an inlet pipe 23 adjacent the bottom of the tank 11 so as to supply water 24 into the tank 11 and also to maintain the level in the tank 11 at a predetermined reference level 8. A heater 91 is mounted in the tank 11 and maintains the water 24 at the desired temperature. An upper portion 7 of the tank 11 is larger than the lower portion and has an extending bottom wall 55 and a front wall 12 in which the discharge spout 13 is mounted. A dipper structure 70 is mounted in the upper portion 7 and is supported so that it moves upwardly and forwardly toward the spout 13 so as to discharge hot water through the spout 13 upon actuation of the dipper. The dipper is supported in the tank 11 in the following manner. A pair of front links 63 and 64 are pivotally mounted on shafts 61 and 62 which extend through the walls 60 and 65 of the tank 11 and the lower ends of the links 63 and 64 are pivotally connected to a lower portion of the dipper structure 70 by pivot pins 181. Rear supporting links 93 and 103 are pivotally connected to the walls 60 and 65 of the tank 11 by shafts 96 and 106. The lower end of the links 93 and 103 are pivotally connected to the lower portion of the dipper structure 70 by pivot pins 94. On the outside of the tank 11, as shown in FIG. 1, the shaft 61 is connected to a link 56, and the links 56 and 63 are rigidly attached to the shaft 61 so that a crank arm is formed by the links 56 and 63 and the shaft 61 which rotates about the shaft 61. The other end of the link 56 is connected by a pivot pin 58 to a link 53. In FIG. 2 the lower end of the link 53 is connected to a cross shaft 51 which is pivotally connected to a drive shaft 42. The drive shaft 42 passes through bearing guides 43 and 44 and connects to a yoke 37 that has downwardly extending sides 38 and 39 and a lower cross-shaft 41 which has a cam follower roller 40 mounted thereon. The shaft 41 has a bolt head 49 and a nut 48 which are mounted on the opposite ends to hold the roller 40 and the shaft 41 in the yoke 37. Openings 46 and 47 are formed in the portions 38 and 39 of the yoke 37 as shown in FIG. 4, and the shaft 32 extends through the openings 46 and 47 and carries a cam 36 which is engageable with the cam follower roller 40 (FIG. 3) as the shaft 32 rotates. In FIG. 4, the rear links 93 and 103 have first ends pivotally connected by pivot pins 96 and 106 to the tank 11 and their second ends are pivotally connected by pivot pins 94 to the lower portion of the dipper structure 70.

The brewer 10 has a coffee discharge spout 16 for discharging beverage into the cup 17.

The dipper structure 70 is formed with a plurality of openings 79 in its bottom surface 78, and one-way valves 81 are mounted in each of the openings 79 and include a single flapper cover 82 and downwardly extending portions 83 which have a bottom ledge 84 as shown in FIG. 2, such that when the dipper structure 70 is in the position shown in FIG. 2, hot water can enter through the one-way valves 81 by moving the flapper cover member 82 upwardly so as to fill the dipper to the level 8 of the water in the tank 11.

When the motor 31 is energized to deliver hot water to the beverage brewer, the motor 31 drives the shaft 32 which turns the cam 36 so it engages the roller 40 to move the dipper actuating shaft 42 downwardly. As the shaft 42 moves downwardly, it moves the link 56 downwardly from the horizontal position shown in FIG. 2 to the vertical position shown in FIG. 3 and the link 63 raises the dipper structure 70 upwardly and toward the front wall 12. Simultaneously, the link 93 rotates about the pivot 96 to raise the rear of the dipper structure 70 until it is in the position shown in FIG. 3. At that position, the water in the dipper structure 70 passes out a front spout 74 of the dipper structure 70 into the spout 13 and into the funnel 14 of the coffee brewer. It is to be realized of course, that the amount of water supplied by the dipper structure 70 is determined by the size of the dipper structure 70 so that an appropriate quantity of beverage will be brewed by the brewer. After discharge of the hot water from the dipper structure 70 as the shaft 32 continues to rotate, the shaft 42 will move upwardly allowing the dipper structure 70 to return to the down position illustrated in FIG. 2 and the dipper structure 70 will fill with hot water through the one-way valves 81 in preparation for the next cycle of the operation of the device.

As shown in FIG. 4, a suitable control 33 is attached to the motor 31 and the brewer and has an operating button 34 so as to initiate brewing of the beverage in a conventional manner.

Thus, the invention periodically supplies hot water to the brewer each time the button is actuated. Coffee is also supplied to the brewer in a conventional manner during each brewing cycle, but such well known coffee supplying means is not illustrated herein.

Although the invention has been described with respect to preferred embodiments, it is not to be so limited as changes and modifications can be made which are within the full intended scope of the invention as defined by the appended claims.

I claim as my invention:

1. A device for supplying hot water to a beverage brewer comprising:

a hot water tank including hot water therein;

a dipper mounted in said tank and movable from a first position to a second position so as to discharge hot water into said beverage brewer in the second position; and driving means connected to said dipper to move the dipper from said first position to said second position wherein the dipper receives water in the first position in response to the driving means advancing the dipper in the hot water tank and receiving the hot water contained therein.

2. The device for supplying hot water to a beverage brewer according to claim 1 wherein said dipper is a container with at least one one-way valve formed therein to let hot water into said dipper.

3. The device for supplying hot water to a beverage brewer according to claim 1 wherein said dipper is pivotally mounted by links to the inside of said hot water tank and said driving means is coupled to said links to move said dipper from said first position to said second position.

4. The device for supplying hot water to a beverage brewer according to claim 1 wherein said driving means includes a motor with an output shaft, a cam mounted on said driving shaft, a cam follower connected to said cam, and a drive shaft connected between said cam follower and said links to move said dipper from the first to said second position.

5. The device for supplying hot water to a beverage brewer according to claim 4 wherein said drive shaft is coupled to said links by shafts which are rotatably supported by said tank and said shafts are non-rotatably connected to said links, and crank arms non-rotatably connected to said shafts, and said drive shaft is pivotally connected to said crank arms.

6. A device for supplying hot water to a beverage brewer comprising:

a hot water tank including hot water therein;

a dipper mounted in said tank and movable from a first position to a second position so as to discharge hot water into said beverage brewer in the second position; and driving means connected to said dipper to move the dipper from said first position to said second position and further wherein said dipper is a container with at least one one-way valve formed therein to let hot water into said dipper.

7. A device for supplying hot water to a beverage brewer comprising:

a hot water tank including hot water therein;

a dipper mounted in said tank and movable from a first position to a second position so as to discharge hot water into said beverage brewer in the second position; and driving means connected to said dipper to move the dipper from said first position to said second position and further wherein said dipper is pivotally mounted by links to the inside of said hot water tank and said driving means is coupled to said links to move said dipper from said first position to said second position.

8. A device for supplying hot water to a beverage brewer comprising:

a hot water tank including hot water therein;

a dipper mounted in said tank and movable from a first position to a second position so as to discharge hot water into said beverage brewer in the second position; and driving means connected to said dipper to move the dipper from said first position to said second position and further wherein said driving means includes a motor with an output shaft, a cam mounted on said driving shaft, a cam follower connected to said cam, and a drive shaft connected between said cam follower and said links to move said dipper from the first position to said second position.

9. The device for supplying hot water to a beverage brewer according to claim 8 wherein said drive shaft is coupled to said links by shafts which are rotatably supported by said tank and said shafts are non-rotatably connected to said links, and crank arms non-rotatably connected to said shafts, and said drive shaft is pivotally connected to said crank arms.

* * * * *